United States Patent
Inoue

(10) Patent No.: US 7,369,177 B2
(45) Date of Patent: May 6, 2008

(54) ELECTRONIC IMAGE PICKUP APPARATUS HAVING PARALLEL CIRCUIT BOARD ARRANGEMENT

(75) Inventor: Takashi Inoue, Hachioji (JP)

(73) Assignee: Olympus Corporation (JP)

( * ) Notice: Subject to any disclaimer, the term of this patent is extended or adjusted under 35 U.S.C. 154(b) by 730 days.

(21) Appl. No.: 10/693,189

(22) Filed: Oct. 23, 2003

(65) Prior Publication Data
US 2004/0080668 A1 Apr. 29, 2004

Related U.S. Application Data

(63) Continuation of application No. 09/271,531, filed on Mar. 18, 1999, now Pat. No. 6,714,248.

(30) Foreign Application Priority Data
Mar. 18, 1998 (JP) ................................ 10-069073

(51) Int. Cl.
*H04N 5/225* (2006.01)
(52) U.S. Cl. .................... 348/374; 348/371; 348/372; 348/335
(58) Field of Classification Search ........ 348/372–374; 396/535
See application file for complete search history.

(56) References Cited

U.S. PATENT DOCUMENTS 5,821,994 A * 10/1998 Tani ........................ 348/222.1
5,867,744 A * 2/1999 Matsukawa et al. ........ 396/287
6,181,380 B1 * 1/2001 Toyofuku et al. ........... 348/373
6,215,964 B1 * 4/2001 Omiya ....................... 396/535
2002/0140846 A1 * 10/2002 Cheung ...................... 348/372
2005/0185002 A1 * 8/2005 Kitsugi et al. .............. 345/629

FOREIGN PATENT DOCUMENTS

JP 61-278830 12/1986

(Continued)

OTHER PUBLICATIONS

Japanese Office Action issued Jan. 9, 2007 in connection with corresponding Japanese patent application No. 10-069073.

*Primary Examiner*—Lin Ye
*Assistant Examiner*—Gevell Selby
(74) *Attorney, Agent, or Firm*—Ostrolenk, Faber, Gerb & Soffen, LLP

(57) ABSTRACT

This electronic image pickup apparatus converts a subject image formed by an image-taking optical system into an electrical signal. In order to realize miniaturization by efficiently arranging components in the apparatus, this apparatus includes a plurality of electrical boards which have respective component sides parallel to a principal plane of the apparatus body having a flat shape and which are arranged so as to be spaced apart at a predetermined interval from the principal plane of the body. A plurality of power supply batteries are arranged in the apparatus so that the axial direction of the plurality of power supply batteries are parallel to the component sides of these electrical boards in a space sandwiched by this plurality of electrical boards. A relay board is arranged in a space between a lens barrel which holds the image-taking optical system and the plurality of power supply batteries and connects the plurality of electrical boards.

7 Claims, 2 Drawing Sheets

FOREIGN PATENT DOCUMENTS

| | | |
|---|---|---|
| JP | HEI 1-124775 | 2/1988 |
| JP | 04-137475 | 5/1992 |
| JP | 06-222423 | 8/1994 |
| JP | 8-186768 | 7/1996 |
| JP | 10-056588 | 2/1998 |

* cited by examiner

ELECTRONIC IMAGE PICKUP APPARATUS HAVING PARALLEL CIRCUIT BOARD ARRANGEMENT

CROSS-REFERENCE TO RELATED APPLICATIONS

The present application is a continuation of prior application Ser. No. 09/271,531 filed Mar. 18, 1999 by Takashi INOUE entitled ELECTRONIC IMAGE PICKUP APPARATUS, now U.S. Pat. No. 6,714,248 B1.

BACKGROUND OF THE INVENTION

1. Field of the Invention

The present invention relates to an electronic image pickup apparatus, and in particular, to an arrangement of internal components for the miniaturization of the electronic image pickup apparatus by efficiently arranging an electrical board and a power supply battery.

2. Description of the Related Art

Recently, electronic image pickup apparatuses such as an electronic still camera have become popular. A camera of this type is constructed so that the camera may record an image signal, image information, and the like as outputted from an image pickup means such as a CCD.

In such an electronic image pickup apparatus, many electrical components are used. Among these electrical components, a large-sized electrical board is used as compared with those used in a conventional camera using a silver halide film.

In addition, it is common to use a plurality of dry battery cells as a power supply in a conventional electronic image pickup apparatus. Therefore, the space that these components occupy in the apparatus inevitably becomes large.

With respect to conventional electronic image pickup apparatuses, various apparatuses have been proposed, for example, the apparatus disclosed in Japanese Unexamined Patent Publication No. 8-186768, and have been put into practical use. In the apparatus as disclosed above, a battery chamber is arranged inside a holding part provided in an end part of the apparatus, a plurality of power supply batteries is contained therein, and a plurality of electrical boards are arranged at a different location from the battery chamber so that the plurality of electrical boards may be positioned parallel to an internal surface in the front side of the apparatus.

The size of an electrical board arranged inside an electronic image pickup apparatus is a major factor in determining the exterior size of the apparatus itself.

According to the conventional means disclosed in Japanese Unexamined Patent Publication No. 8-186768 and the like, a battery chamber is provided in an end part of the apparatus. Hence, it is not possible to arrange a large-sized electrical board and the like near this battery chamber.

In addition, according to the means disclosed in the publication, each member of the image pickup system, such as a picture-taking lens and an imager, is unitized and is arranged at a position independent from a body part of the electronic image pickup apparatus. Therefore, if this arrangement is adopted, there arises a problem that the apparatus becomes large-sized.

SUMMARY OF THE INVENTION

A first object of the present invention is to provide an electronic image pickup apparatus that is actually miniaturized by efficiently arranging the internal components of the electronic image pickup apparatus.

A second object of the present invention is to provide an electronic image pickup apparatus that can be miniaturized without various essential functions of the electronic image pickup apparatus being impaired. Approaches for achieving this object are to sufficiently secure a space necessary for arranging components such as an electrical board inside the electronic image pickup apparatus, and to efficiently arrange a power supply battery inside a body of the apparatus without wastefulness.

Briefly, a first embodiment of the present invention provides an electronic image pickup apparatus that converts a subject image formed by an image-taking optical system into an electrical signal by using an imager. The apparatus comprises a plurality of electrical boards that have respective component sides parallel to a principal plane of the apparatus body and which have a flat shape and are arranged so as to be spaced apart at predetermined intervals, a plurality of power supply batteries arranged so that the axial direction of the plurality of power supply batteries may be parallel to the component sides of these electrical boards in a space sandwiched by this plurality of electrical boards, and a relay board that is arranged in a space between a lens barrel holding the image-taking optical system and the plurality of power supply batteries and connects the plurality of electrical boards.

In addition, a second embodiment of the present invention provides an electronic image pickup apparatus constructed according to the first embodiment of the electronic image pickup apparatus and further comprising a strobe flashing unit arranged on an upper surface of the body, and a capacitor for strobe flashing arranged in a space under the strobe flashing unit and between the lens barrel and an internal side wall of the body.

Furthermore, a third embodiment of the present invention is an electronic image pickup apparatus constructed according to the second embodiment of the electronic image pickup apparatus, wherein the axial direction of the capacitor for strobe flashing is approximately parallel to the component sides of the electrical boards.

A fourth embodiment of the present invention is constructed according to the first embodiment of the electronic image pickup apparatus, wherein an electrical board arranged in the side of the apparatus which is placed near a subject, relative to the remainder of the plurality of electrical boards, has a power supply circuit mounted thereto, and further has a notched part for avoiding interference with the lens barrel.

A fifth embodiment of the present invention is constructed according to the first embodiment of the electronic image pickup apparatus, further comprising a plurality of connecting terminals installed at predetermined positions on the plurality of electrical boards and arranged so that some of the plurality of connecting terminals may be exposed to the exterior of the body, and an element for attaching a tripod arranged in a space that is surrounded by the plurality of connecting terminals and forming part of a bottom part of the body.

A sixth embodiment of the present invention is constructed according to the fifth embodiment of the electronic image pickup apparatus, wherein a connecting terminal installed on the electrical board among the plurality of connecting terminals is a power input terminal for supplying power from an external power supply.

The above and further objects and advantages of the present invention will appear more fully from the following detailed description.

The present invention can provide an electronic image pickup apparatus that is miniaturized by efficiently arranging the internal components in the electronic image pickup apparatus.

In addition, the present invention can sufficiently secure a space necessary for arranging components such as an electrical board inside the electronic image pickup apparatus, and can efficiently arrange a power supply battery inside the body of the apparatus without wastefulness. Therefore, the present invention can provide an electronic image pickup apparatus that can be miniaturized without various essential functions of the electronic image pickup apparatus being impaired.

DESCRIPTION OF THE PREFERRED EMBODIMENTS

First, various components provided inside an electronic image pickup apparatus of this embodiment will be described below.

Figure 1:
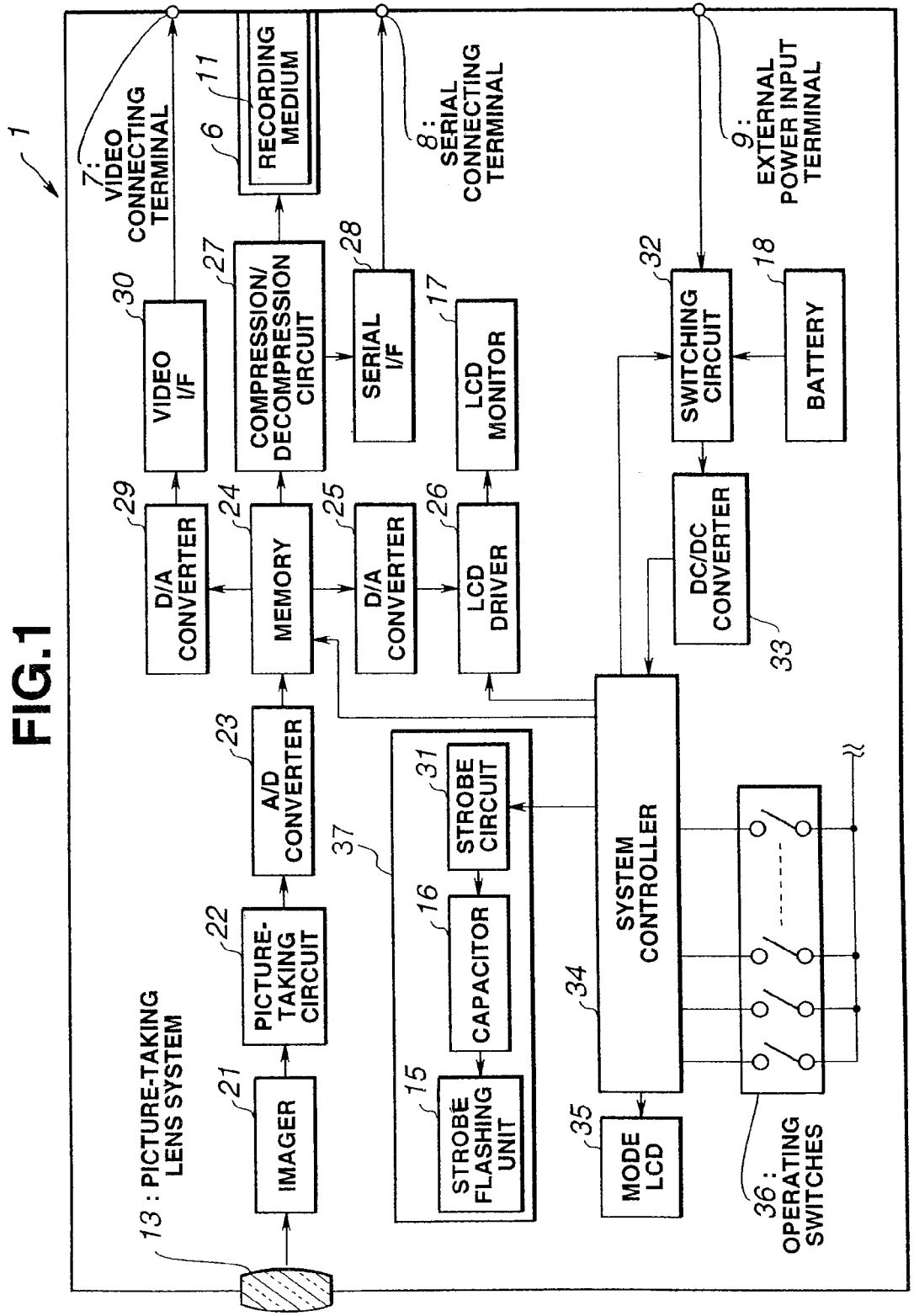
FIG. 1 is a block diagram showing the construction of an electronic image pickup apparatus according to an embodiment of the present invention.

The electronic image pickup apparatus 1 comprises: an imager 21 that converts a subject image formed by a picture-taking lens system 13 as shown in FIG. 1 into an electrical signal and is composed of, for example, a CCD and the like; a picture-taking circuit 22 for performing predetermined image processing (preprocessing) for an image signal converted by the imager 21; an A/D converter 23 for converting the image signal (analog signal), outputted from the picture-taking circuit 22 into a digital signal; memory 24 such as a buffer memory for temporarily recording image information converted into the digital signal; a D/A converter 25 for converting the digital signal recorded in the memory 24 into an analog signal in an optimum state for displaying the image on a picture display unit, that is, an LCD monitor 17 that is a reflective liquid crystal display unit which is small and has low power consumption; an LCD driver 26 for performing drive control of the LCD monitor 17; a compression/decompression circuit 27 that performs compression processing so as to make it possible to record the digital image signal recorded in the memory 24 onto a recording medium 11 such as a memory card and performs decompression processing so as to restore the image signal recorded on the recording medium 11 in a compressed state to a signal in a form such that various types of image processing can be performed; a memory card slot 6 which is a recording medium port composed of a mount port used for mounting the recording medium 11, a card I/F (an electrical circuit), and the like; a serial connecting terminal 8 for mounting connection means such as a connection cable for electrically connecting the apparatus 1 to an external peripheral device (not shown) such as a personal computer; a serial interface (I/F) 28 composed of an electrical circuit for connecting the serial connecting terminal 8 to the compression/decompression circuit 27 and the like; a D/A converter 29 for converting the digital image signal recorded in the memory 24 into an analog signal in an optimum state for performing processing in an external piece of equipment (not shown) which can process a video signal and the like, such as a TV monitor; a video connecting terminal 7 for mounting connection means such as a connection cable for electrically connecting the apparatus 1 to the external equipment; a video interface (I/F) 30 composed of an electrical circuit for connecting the video connecting terminal 7 to the D/A converter 29 and the like; an external power input terminal 9 for supplying power from an external power supply; a power supply battery 18 such as a plurality of dry cells to be contained inside the apparatus 1; a switching circuit 32 of power supply routes that performs switching between two lines of the power supply means, that is, the power supply battery 18 and the external power input terminal 9; a DC/DC converter 33 for converting a power supply voltage supplied thereto; a mode LCD 35 that is a display means for displaying an operation mode of the apparatus 1 and the settings of different functions so as to make it possible to visually identify the mode and settings; a strobe unit 37 that is an auxiliary light source and is composed of a strobe flashing unit 15, a capacitor 16 for strobe flashing, a strobe circuit 31, and the like; respective members such as operating switches 36 composed of a plurality of input switches for inputting various input signals to the apparatus 1, and the like; and a system controller 34 that is a control means for controlling the entire apparatus 1.

In addition, the electrical members among the above-described members are mounted on a plurality of electrical boards which will be described later, and are arranged at predetermined positions inside the apparatus 1.

Furthermore, the above-described operating switches 36 are a plurality of input switches provided for specifying various functions to the control means such as the system controller 34, and for operating and controlling the electronic image pickup apparatus 1 by commanding various operations. The operating switches 36 are formed as, for example, a release SW for giving a command for executing image pickup operation, a mode transfer SW for giving a command for switching an operation mode, and the like.

In a conventional electronic image pickup apparatus, it is common to provide a liquid crystal display unit with a back light as the picture display unit. However, this liquid crystal display unit with the back light has problems in that the unit is thick in the depth direction and power consumption thereof is large.

In the electronic image pickup apparatus 1 of this embodiment, as described above, a reflective liquid crystal display unit is used as the picture display unit (LCD monitor 17). Since this reflective liquid crystal display unit is constructed so that an image can be displayed using outdoor daylight, a back light is not necessary. In addition, it is possible to miniaturize the apparatus and to easily reduce power consumption. Therefore, in the electronic image pickup apparatus 1 of this embodiment, the reflective liquid crystal display unit contributes to further thinning and energy-saving of the apparatus when it is used as the LCD monitor 17.

The arrangement of various components inside the electronic image pickup apparatus 1 constructed in this manner is described below.

Figure 2:
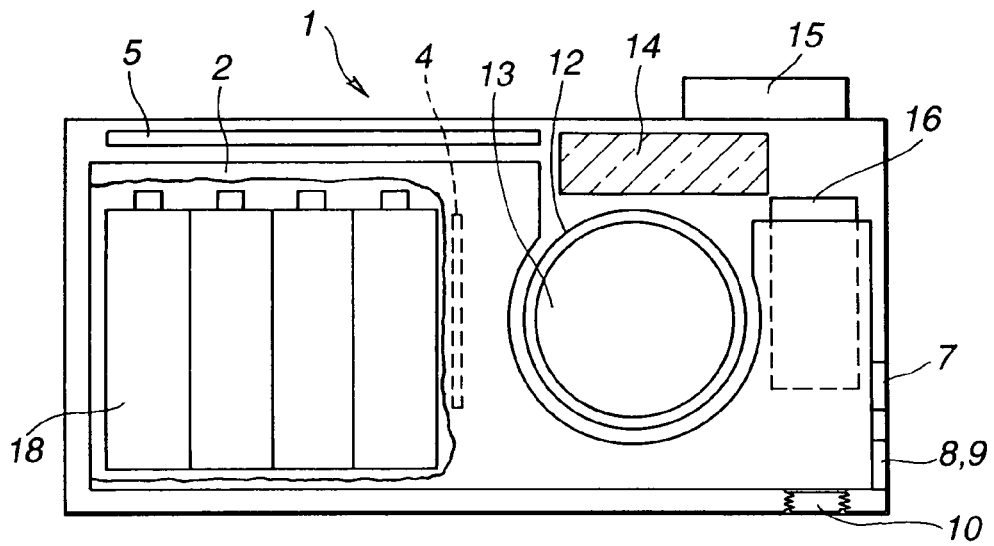
FIG. 2 is a drawing showing an internal arrangement of the principal members as viewed from the front of the electronic image pickup apparatus shown in FIG. 1.
Figure 3:
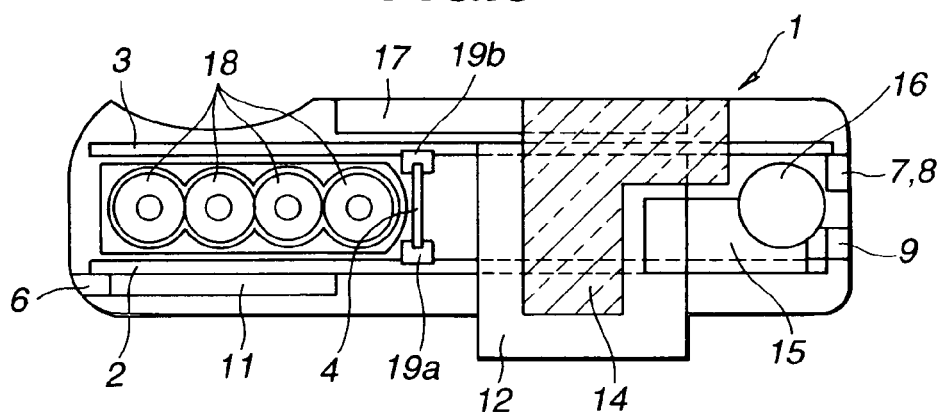
FIG. 3 is a drawing showing the internal arrangement of the principal members as viewed from the top of the electronic image pickup apparatus shown in FIG. 1.
Figure 4:
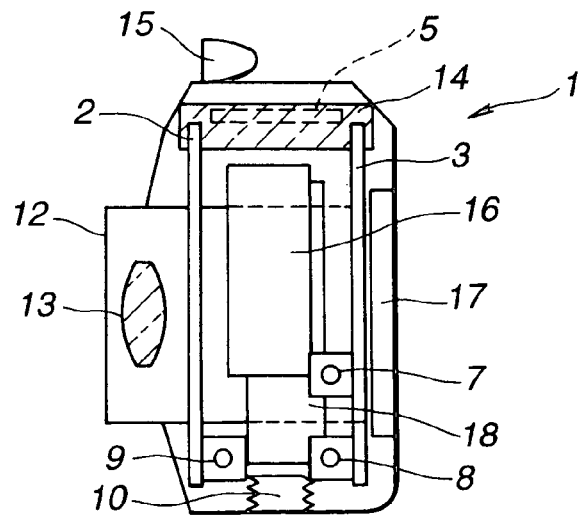
FIG. 4 is a drawing showing the internal arrangement of the principal members as viewed from the right side of the electronic image pickup apparatus shown in FIG. 1.

As shown in FIGS. 2 to 4, a body of this electronic image pickup apparatus 1 is formed in a nearly flat shape having principal planes in which a front side and a back side thereof have comparatively large areas.

A picture-taking lens barrel 12 holding a picture-taking lens system 13 is provided at a predetermined position that is a little to the right from the central vicinity of the front side as viewed from the front of the electronic image pickup apparatus 1. An imager 21 is provided behind this picture-taking lens barrel 12 which has its image pickup plane trained toward the front (not shown in FIGS. 2 to 4). Due to this arrangement, a subject image condensed by the picture-taking lens system 13 is imaged on the image pickup plane of the imager 21. In addition, for example, a lens system composed of a single focus lens system having a single focal distance is used as the picture-taking lens system 13.

A finder optical system 14 for observing the subject image and determining an image pickup range and the like at the time of an image pickup operation by the apparatus 1 is provided inside the body on the upper side thereof near the picture-taking lens barrel 12. This finder optical system 14 is an optical system composed of object and ocular lenses, a prism, and the like, and is formed with an optical system different from the picture-taking lens system 13. Therefore, so as to reduce discrepancy between an observation range of an image including the subject image by the finder optical system 14 and an image pickup range of an image to be actually picked up by the picture-taking lens system 13, that is, parallax, the finder optical system 14 is arranged near the picture-taking lens barrel 12.

In addition, the LCD monitor 17 can reproduce and display image data recorded on the recording medium 11 after image pickup by the apparatus 1 as an image, and is arranged substantially at the center of the back side of the body of the apparatus 1 with its image display screen located on the back side so as to be parallel to the principal plane of the body of the apparatus 1. This LCD monitor 17 can reproduce and display the image data recorded as an image at the time of a reproducing operation, and further has a role as a finder for observing the subject image similarly to the finder optical system 14 and determining an image pickup range and the like. A plurality of operating switches (not shown) for commanding functions at the time of using the LCD monitor 17 are provided in the vicinity of the LCD monitor 17.

Inside the body of the apparatus 1, two large electrical boards, that is, a front electrical board 2 and a rear electrical board 3 are arranged in parallel to each other while being spaced apart at a predetermined interval so as to be parallel to the principal plane of the body. Both electrical boards 2 and 3 are electrically connected to each other by a relay board 4 through connectors 19a and 19b (FIG. 3) mounted at predetermined positions on the respective boards.

The electrical board 2 has a shape which avoids the picture-taking lens barrel 12. Thus, the electrical board 2 is formed with a notch for making it possible to avoid interference with the picture-taking lens barrel 12. FIG. 2 shows the electrical board 2 with a partially broken away portion for showing a power supply battery 18 which will be described later.

Here, a plurality of electrical parts at both the left and right sides as viewed from the front of the electronic image pickup apparatus 1 can be provided in an arrangement which sandwiches the picture-taking lens barrel 12. For example, two electrical boards arranged on both the left and right sides of the picture-taking lens barrel 12, and a connecting member and the like such as a harness for transferring electrical signals is provided between these two electrical boards.

In the electronic image pickup apparatus of this embodiment, the electrical board 2 is formed having the shape described above, that is, a shape for avoiding the picture-taking lens barrel 12. In an alternative arrangement, it is possible to omit the connecting member such as the harness in a case in which two electrical boards are arranged at both the left and right sides of the picture-taking lens barrel 12. Hence, in this embodiment, it is possible to more efficiently use an inside space of the apparatus 1.

In addition, components such as memory card slot 6 including a card I/F and the like, a strobe circuit 31, a switching circuit 32 of the power supply routes, and a DC/DC converter 33 are mounted on the front electrical board 2 (not shown in FIGS. 2 to 4; refer to FIG. 1). Furthermore, an external power input terminal 9 is provided at a predetermined position that is near the bottom of a right side surface as viewed from the front of the body. A terminal portion of this external power input terminal 9 is provided so as to be exposed to the exterior of the apparatus on the right side of the body of the apparatus 1. Hence, a power cable for supplying power from an external source can be connected to this terminal port.

In addition, for example, the picture-taking circuit 22, system controller 34, LCD driver 26, video I/F 30, serial I/F 28, and the like are mounted on the rear electrical board 3 (not shown in FIGS. 2 to 4; refer to FIG. 1). Furthermore, the video connecting terminal 7 and serial connecting terminal 8 are provided at predetermined positions that are on the right side near the bottom surface as viewed from the front of the body. Terminal portions of these connecting terminals 7 and 8, similarly to the external power input terminal 9, are provided so as to be exposed to the exterior of the apparatus on the right side of the body of the apparatus 1. Hence, connection cables for connecting the apparatus 1 to predetermined external equipment can be connected to these terminal ports.

A screw hole 10 that is a member for attaching a tripod is provided in a space that is surrounded by the front and rear electrical boards 2 and 3, and near the external power input terminal 9, video connecting terminal 7, and serial connecting terminal 8, and is part of a bottom side of the body of the apparatus 1.

Usually, it is common to use the screw hole 10 to attach a tripod when a picture-taking operation is performed with the electronic image pickup apparatus 1 and the like mounted on the tripod. When mounted on the tripod, the electronic image pickup apparatus 1 is supported only by a member (a part of the exterior member on the bottom side) near the screw hole 10 for attaching the tripod, and hence the load is concentrated on this part.

In addition, the load generated when the power cables or connecting cables are attached or detached also concentrates on an exterior member in the vicinity of the video connecting terminal 7 and serial connecting terminal 8 for performing connection to external equipment, and of the external power input terminal 9 for supplying power from an external power supply.

In a regular apparatus similar to the apparatus 1, it is known to form the exterior member near the screw hole 10 for attaching a tripod, the external power input terminal 9, the video connecting terminal 7, the serial connecting terminal 8, and the like so that the exterior member has a higher strength than other parts of the apparatus.

In the electronic image pickup apparatus of this embodiment, members to which external forces are more likely to be applied, that is, the screw hole 10 for attaching a tripod, the external power input terminal 9, the video connecting terminal 7, the serial connecting terminal 8, and the like are arranged so as to be concentrated together in one area of the apparatus, as seen in FIG. 4. At the same time, the exterior member is formed to have a higher strength than other parts.

On the other hand, the strobe unit 37 (FIG. 1) in the apparatus 1 is arranged at a predetermined position inside the body to the right as viewed from the front. A strobe unit is provided in which the strobe flashing unit 15 can freely pop up from and pop back down into the body, that is, a so-called popup type strobe unit 37. When the strobe unit 37 becomes necessary at the time of picture-taking, the strobe flashing unit 15 interlocks with a power-on operation of the main power SW and the like, and pops up on the upper side of the body. In addition, the unit is arranged so that, in the popup state (the state shown in FIGS. 2 and 4), a flashing surface of the strobe flashing unit 15 faces the front of the apparatus.

Furthermore, a capacitor 16 for strobe flashing has a nearly cylindrical shape and is arranged in a space under the strobe flashing unit 15 that is, a space between the front and rear electrical boards 2 and 3, and a space between the lens barrel 12 and an internal right side wall of the body so that the axial direction of the capacitor 16 may be parallel to the component sides of both of the electrical boards 2 and 3 and may be perpendicular to the bottom surface of the body.

On the other hand, a battery chamber for containing a plurality of power supply batteries 18 is provided at a predetermined position to the left as viewed from the front of the apparatus 1, and in a space between the front and rear electrical boards 2 and 3 so that the axial direction of the plurality of power supply batteries may be parallel to the component sides of both of the electrical boards 2 and 3. Inside this battery chamber, four dry cells having substantially cylindrical shapes can be contained in a row without overlapping each other. Furthermore, the battery chamber is formed so that the axial direction of the plurality of power supply batteries 18 to be contained inside the battery chamber may be substantially perpendicular to the bottom surface of the body of the apparatus 1.

Moreover, an opening (not shown) for making it possible to insert or remove the power supply batteries 18 contained in the battery chamber is provided in the bottom part of the body. A battery chamber lid (not shown) for opening and closing this opening is rotatably provided in an exterior member on the bottom side of the body.

In addition, a relay board 4 is arranged in a space between the power supply batteries 18 and lens barrel 12 and connected through the connectors 19a and 19b to both the electrical boards 2 and 3.

Furthermore, an insertion opening for making it possible to insert and remove the recording medium 11 such as a memory card, is provided at a predetermined position toward the front on the left side as viewed from the front of the apparatus 1. The memory card slot 6 and this opening communicate with each other inside the body.

Moreover, an operation board 5 is provided at a predetermined position toward the upper surface of the apparatus 1. For example, contacts of the operating switches 36, the mode LCD 35, a microcomputer (not shown) for controlling circuits in an operation system, and the like are mounted on this operation board 5.

In addition, in FIGS. 2 to 4, a lens protection member, not shown and which covers the front side of the picture-taking lens system 13 when the electronic image pickup apparatus is in a non-picture-taking state, for example, a state of non-use of reproduction, is provided so as to be slidable in the direction parallel to the principal plane at the front side of the body, that is, the width direction of the body of the electronic image pickup apparatus 1.

Usually, the external power input terminal 9, the video connecting terminal 7, the serial connecting terminal 8, and the like provided toward the bottom surface at the right side of the body are not used in normal picture-taking. Therefore, a protective lid member (not shown) covering the external power input terminal 9, the video connecting terminal 7, the serial connecting terminal 8, and the like, so as to prevent dust and dirt from entering into these terminals to the inside of the apparatus 1 is provided so as to be rotatable on an exterior member of the body.

As described above, according to the above-described embodiment, two large electrical boards, that is, the front and rear electrical boards 2 and 3 are provided so that the electrical boards 2 and 3 are parallel to the principal plane of the body of the apparatus, and large components such as the power supply battery 18, and capacitor 16 for strobe flashing are efficiently arranged in a space between the electrical boards 2 and 3. Hence, it is possible to realize miniaturization of the electronic image pickup apparatus 1 by securing the necessary areas occupied by electric boards.

In addition, the screw hole 10 for attaching a tripod is arranged by effectively using a space for providing the plurality of connecting terminals, that is, the external power input terminal 9, the video connecting terminal 7, the serial connecting terminal 8, and the like. Therefore, it is possible to realize the miniaturization of the electronic image pickup apparatus 1. Furthermore, by arranging the components on which forces concentrate in the same area, it becomes easy to secure a predetermined strength, and it is possible to simplify the production process steps of the exterior members of the body. Hence, it is possible to contribute to the reduction of production costs of the apparatus.

Furthermore, in the electronic image pickup apparatus 1, a detachable medium such as a memory card is used as the recording medium 11. To accommodate the recording medium, the memory card slot 6 is provided in the body of the apparatus 1.

In one alternative construction of the invention, for example, it is conceivable that a memory fixed in the inside of the body of the electronic image pickup apparatus 1 is used as the recording medium 11. In this case, since the memory card slot 6 including the card I/F becomes unnecessary, the fixed memory and the like can be mounted on a component side of the front electrical board 2 at the location otherwise occupied by the slot 6. With this embodiment, it is possible to obtain the same effects as those in the above-described embodiment.

It is apparent that a wide range of different working modes can be formed on the basis of the present disclosure without departing from the spirit and scope of the present invention. The present invention is therefore not restricted by any specific embodiment except being limited by the appended claims.

What is claimed:

1. An electronic image pickup apparatus that converts a subject image imaged by an image-taking optical system into an electrical signal using an imager provided behind a picture-taking lens barrel, comprising:
    a generally flattened, apparatus body having a principal body plane that is associated with and generally aligned with a front side of the apparatus;
    first and second electrical boards having respective component sides oriented substantially parallel to the principal body plane of the apparatus, the first and second electrical boards being spaced apart at a predetermined interval to create a space;

the lens barrel extending generally perpendicularly to the principal body plane;

a plurality of power supply batteries arranged in the space between the electrical boards so that an axial direction of the plurality of power supply batteries is parallel to the component sides of the electrical boards and the batteries extend in a row without overlapping one another and are situated on a first side of the apparatus body;

a relay board arranged in the space and connecting the electrical boards;

a strobe flashing unit arranged on an upper surface of the apparatus body; and a capacitor for strobe flashing situated on the second side of the apparatus body which is opposite the first side of the apparatus body and arranged in a space under the strobe flashing unit and between the lens barrel and an internal side wall of the apparatus body, wherein an axial direction of the capacitor is substantially parallel to the component sides of the electrical boards and substantially perpendicular to a bottom part of the apparatus body.

2. An electronic image pickup apparatus according to claim 1, wherein an axial direction of the plurality of power supply batteries is parallel to the axial direction of the capacitor for strobe flashing.

3. An electronic image pickup apparatus according to claim 1, further comprising:

a plurality of connecting terminals installed at predetermined positions on the electrical boards and arranged so that a part of each of the plurality of connecting terminals is exposed to the exterior of the apparatus through a side of the apparatus body; and a member for attachment of a tripod that is arranged in a space surrounded by the plurality of connecting terminals and located on the bottom surface of the apparatus body.

4. An electronic image pickup apparatus according to claim 1, wherein the location of the relay board is bounded by the electrical boards, the lens barrel, and the power supply batteries.

5. An electronic image pickup apparatus according to claim 1, further comprising an image memory board having a main body plane that extends substantially parallel to the principal body plane of the apparatus, the memory board being positioned in a space between the front side of the apparatus and the electrical boards.

6. An electronic image pickup apparatus according to claim 1, further comprising a battery chamber in which the plurality of batteries are located and a battery chamber lid provided at the bottom surface of the apparatus body.

7. An electronic image pickup apparatus according to claim 1, further comprising a reflective liquid crystal display unit disposed at a rear side of the body of the apparatus.

* * * * *